United States Patent
Krinos et al.

(10) Patent No.: US 10,498,765 B2
(45) Date of Patent: Dec. 3, 2019

(54) VIRTUAL INFRASTRUCTURE PERIMETER REGULATOR

(71) Applicant: AT&T Intellectual Property I, L.P., Atlanta, GA (US)

(72) Inventors: Dimitri Krinos, Tampa, FL (US); Gary R. Flack, Smithton, IL (US); Adrian Cepleanu, Anthem, AZ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 77 days.

(21) Appl. No.: 15/169,830

(22) Filed: Jun. 1, 2016

(65) Prior Publication Data

US 2017/0353494 A1  Dec. 7, 2017

(51) Int. Cl.
*G06F 17/00* (2019.01)
*H04L 29/06* (2006.01)

(52) U.S. Cl.
CPC .............. *H04L 63/20* (2013.01); *H04L 63/10* (2013.01)

(58) Field of Classification Search
CPC ...... H04L 45/00; H04L 45/123; H04L 45/125
USPC .............................. 370/254, 401, 429; 726/1
See application file for complete search history.

(56) References Cited

U.S. PATENT DOCUMENTS

| | | | |
|---|---|---|---|
| 8,284,685 B2 | 10/2012 | Bajpay et al. | |
| 9,049,172 B2 | 6/2015 | Dargis | |
| 9,306,949 B1* | 4/2016 | Richard | H04L 63/0272 |
| 9,979,602 B1* | 5/2018 | Chinnakannan | H04L 41/12 |
| 2004/0165581 A1* | 8/2004 | Oogushi | H04L 12/2856 370/352 |
| 2008/0148386 A1* | 6/2008 | Kreuk | H04L 63/0272 726/15 |
| 2010/0027549 A1 | 2/2010 | Satterlee et al. | |
| 2010/0061242 A1* | 3/2010 | Sindhu | H04L 41/0806 370/235 |
| 2010/0125902 A1* | 5/2010 | Killian | H04L 63/0272 726/15 |
| 2010/0146038 A1* | 6/2010 | Hajiaghayi | H04L 67/2842 709/203 |
| 2011/0032843 A1 | 2/2011 | Papp et al. | |
| 2011/0069634 A1* | 3/2011 | Hajiaghayi | H04L 45/00 370/254 |
| 2014/0010109 A1* | 1/2014 | Himura | H04L 41/12 370/254 |
| 2014/0059226 A1* | 2/2014 | Messerli | G06F 9/5072 709/226 |
| 2014/0201374 A1 | 7/2014 | Ashwood-Smith et al. | |
| 2014/0351452 A1* | 11/2014 | Bosch | H04L 67/10 709/242 |
| 2014/0365634 A1* | 12/2014 | Metz | H04L 41/14 709/224 |

(Continued)

FOREIGN PATENT DOCUMENTS

EP        2947824        11/2015

*Primary Examiner* — Gary S Gracia (57) ABSTRACT

Methods, computer-readable media and devices are disclosed for generating a security decision for network management traffic for a virtual provider edge router of a network. For example, a processor may receive a security policy of the network, receive an assignment to a virtual provider edge router in the network, receive network management traffic for the virtual provider edge router, generate a security decision for the network management traffic based upon the security policy, and perform a task in response to the security decision.

20 Claims, 4 Drawing Sheets

(56) References Cited

U.S. PATENT DOCUMENTS

| | | | |
|---|---|---|---|
| 2014/0376367 A1* | 12/2014 | Jain | H04L 47/20 |
| | | | 370/230 |
| 2015/0124622 A1 | 5/2015 | Kovvali et al. | |
| 2015/0139238 A1 | 5/2015 | Pourzandi et al. | |
| 2015/0326535 A1* | 11/2015 | Rao | H04L 41/5054 |
| | | | 726/15 |
| 2015/0358248 A1 | 12/2015 | Saha et al. | |
| 2015/0381323 A1* | 12/2015 | Ammirata | H04L 43/087 |
| | | | 370/516 |
| 2015/0381569 A1* | 12/2015 | Visser | H04L 63/0272 |
| | | | 726/15 |
| 2016/0028632 A1 | 1/2016 | Vasseur et al. | |
| 2016/0043944 A1* | 2/2016 | Felstaine | H04L 45/70 |
| | | | 370/389 |
| 2016/0277290 A1* | 9/2016 | Sivabalan | H04L 45/50 |

\* cited by examiner

VIRTUAL INFRASTRUCTURE PERIMETER REGULATOR

The present disclosure relates generally to network security, e.g., core telecommunications network security, and more particularly to methods, computer-readable media, and devices for providing security decisions to virtual provider edge routers or other network virtualization functions at the network edge relating to network management traffic.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like may be instantiated from the common resource pool.

SUMMARY

In one example, the present disclosure discloses a method, computer-readable medium, and device for generating a security decision for network management traffic for a virtual provider edge router of a network. For example, a processor may receive a security policy of the network, receive an assignment to a virtual provider edge router in the network, receive network management traffic for the virtual provider edge router, generate a security decision for the network management traffic based upon the security policy, and perform a task in response to the security decision.

In another example, the present disclosure discloses a method, computer-readable medium, and device for assigning a virtual provider edge router to a virtual network function implementing a security policy for network. For example, a processor may instantiate the virtual network function on a first host device in the network, load the virtual network function with the security policy for the network, and assign the virtual provider edge router to the virtual network function. In one example, the virtual network function resides on a second host device in the network. In addition, in one example, network management traffic for the virtual provider edge router is forwarded to the virtual network function on the host device for generating a security decision for the network management traffic based upon the security policy.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for generating a security decision for network management traffic for a virtual provider edge router of a network, e.g., a core telecommunications network and methods, computer-readable media and devices for assigning a virtual provider edge router to a virtual network function implementing a security policy for a core telecommunications network. As referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the core telecommunications network. In addition, "network management traffic" may refer to Simple Network Management Protocol (SNMP), Network Configuration Protocol (NETCONF), and ConfD flows, and the like, which may be conveyed via Telnet, Secure Shell (SSH) sessions, and the like, and which may be used to manage devices, such as to deploy configuration updates, to decommission a device, to retrieve settings and usage logs, and so on.

In one example, the present disclosure provides a virtual network function (VNF), which may be referred to as a virtual infrastructure perimeter regulator (VIPR) and which provides security decisions associated with network management traffic for other virtual network functions (VNFs) at the edge of a core telecommunications network/backbone network, such as virtual provider edge (VPE) routers. In a software defined network (SDN), a controller may instantiate VPE routers on shared hardware (e.g., network function virtualization infrastructure (NFVI)/host device(s)) that may be physically located in various data centers. Multiple VPE routers may be instantiated on a single physical device, or on several devices in a single data center or in different data centers. Each of the VPE routers may be configured to provide network access to one or more customer edge (CE) routers. Thus, for example, a new VPE router may be instantiated when the existing VPE routers in an area are at capacity and there are one or more new CE routers to connect to the core telecommunications network. An existing VPE router may also be reconfigured to additionally provide a new interface to a new CE router, in addition to CE routers that the VPE router may already be servicing. Likewise, an existing VPE router may also be reconfigured to stop supporting a particular CE router. For instance, when CE routers may be increasing the volume of traffic to a VPE router, at least one of the CE routers may be offloaded to a new VPE router, or to another VPE router that has spare capacity. As used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

In one example, the reconfiguring of a VPE router may involve personnel of the network operator attempting to access a host device/NFVI via a device located in a network operations center (NOC) and deploying a configuration update to the VPE router on the host device. Similarly, a customer may complain about problems with a service or connectivity, which may trigger personnel attempting to access the host device, and more particularly the VPE router on the host device, to retrieve current configuration settings, usage logs, and so forth. In still another example, a controller that is responsible for VNF management may reconfigure the VPE router in an automated manner, e.g., based upon automatic triggers, such as a traffic volume exceeding a threshold, a detection of a failure of a different VPE router or other network elements, and so on. In these and other examples, requests to access usage logs, reconfigure or decommission a VPE router, and so on, may generate network management traffic, such as NETCONF flows, and the like. In another example, network management traffic may comprise outbound communications from a VPE router, such as to forward operating parameters, usage statistics, call detail records (CDRs), and the like to a controller, an SNMP trap, or to another device in the core telecommunications network or in a trusted domain.

In one example, these types of network management traffic may be gated by a virtual infrastructure perimeter regulator (VIPR). This is in contrast to tasking each VPE router with enforcing security policies and maintaining copies of security policies, such as access control lists (ACLs), and so forth. For example, a VIPR may also comprise a virtual network function (VNF) that is instantiated on shared hardware. A VIPR may be deployed within the same physical device as a VPE router, but need not be. For example, a VIPR may be deployed within a different physical device in a same data center as a plurality of VPE routers that are supported by the VIPR.

In one example, a VIPR may be managed by a controller, e.g., an SDN controller. In one example, the SDN controller may comprise a network security component. For instance, in one example, a single controller may manage the VIPR as well as the VPE routers and other VNFs of the core telecommunications network. In another example, a plurality of controllers may control various VNFs in the network. For instance, a first controller may control VNFs related to security, e.g., one or more VIPRs, uniform resource locator (URL) blocking devices (UBDs), and so on, while another controller may control VPE routers, another controller may control other VNFs, such as route reflectors, and so forth.

As referred to herein, a controller controlling a VIPR may also be tasked with managing network security functions. For example, the controller may configure the VIPR with various security policies of the core telecommunications network, which may then be applied to gate or filter network management traffic to and from a plurality of different VPE routers. To illustrate, a network operator may desire that only network management traffic that originates within trusted network operations centers (NOCs) be allowed for a VPE router in the core telecommunications network/backbone network and that a VPE router only be able to send network management traffic to designated devices in the core telecommunications network or in another trusted domain. Accordingly, a VIPR may be loaded with a security policy such as an access control list (ACL), e.g., a "whitelist" of domains and/or devices from which network management traffic may originate or to which network management traffic may be sent and/or a "blacklist" of domains and/or devices for which network management traffic is prohibited.

In one example, the core telecommunications network may be configured such that all incoming network management traffic for a VPE router is first routed to a VIPR that is assigned to the VPE router. For instance, different routings may be configured in the core telecommunications network for different types of traffic. For example, routers within the core telecommunications network may be configured to identify network management traffic and to forward the network management traffic to a VIPR, while routing customer data traffic, or other traffic that does not relate to network management functions differently through the core telecommunications network. The network management traffic may be identified in various ways, such as by the protocol(s) utilized, the Internet Protocol (IP) address(es) and/or the port number(s) contained within headers of data units in the traffic, and so forth. To illustrate, upon receiving network management traffic, such as a request for updating/reconfiguring the VPE router, accessing usage logs, retrieving current settings, and so forth, an intermediate router may forward the traffic to the VIPR which may compare the traffic to the network security policy (or policies) and make a decision as to whether the traffic should be allowed to reach the VPE. For example, the VIPR may allow SSH access from a device in a network operations center (NOC) into the VPE router or from a security component in the core telecommunications network, but may block access to the VPE router from any device outside of the NOC or the core telecommunications network.

Virtualization of the core telecommunications network opens up numerous connectivity paths between domains that did not exist for a traditional "physical" network, making it more and more unmanageable to operate the network the way in which it has been done in the past. The use of a VIPR, or a number of VIPRs, enables more centralized management of security policy and enforcement. Instead of deploying security features within each provider edge (PE) router, where each PE router may have different vendor specific requirements for configuring security policies and making changes, a much smaller number of VIPRs may enforce network security policies. In addition, when changes are made, a controller does not need to push changes to tens of thousands of PE routers, or VPE routers, but may propagate changes to a much smaller number of VIPRs.

VIPRs enable network security policy control to reside at the virtual edge, as opposed to the underlying transport network having that control. In addition, network security policy is enforced at the data plane and may be implemented in a stateless manner, as opposed to most firewalls which are stateful entities. As mentioned above, VIPRs may be deployed and used to apply security policy to network management traffic. In one example, the network management traffic that is filtered by a VIPR is specifically network management traffic that is traversing different trust levels and/or different domains. However, the security functions of the VIPR may also be extended to all traffic that transits different domains and different trust levels. For instance, the core telecommunications network/backbone network may include a plurality of different routing domains. In addition, some of the routing domains may have different trust levels. For instance, certain types of traffic, traffic for certain customers, and so forth may be selectively routed through domains with higher trust levels than other types of traffic. Thus, in another example, instances of VIPR may be deployed by a controller to enforce security policy with respect to traffic entering and leaving domains with different trust levels. These and other aspects of the present disclosure are discussed in greater detail below in connection with the examples of FIGS. 1-4.

Figure 1:
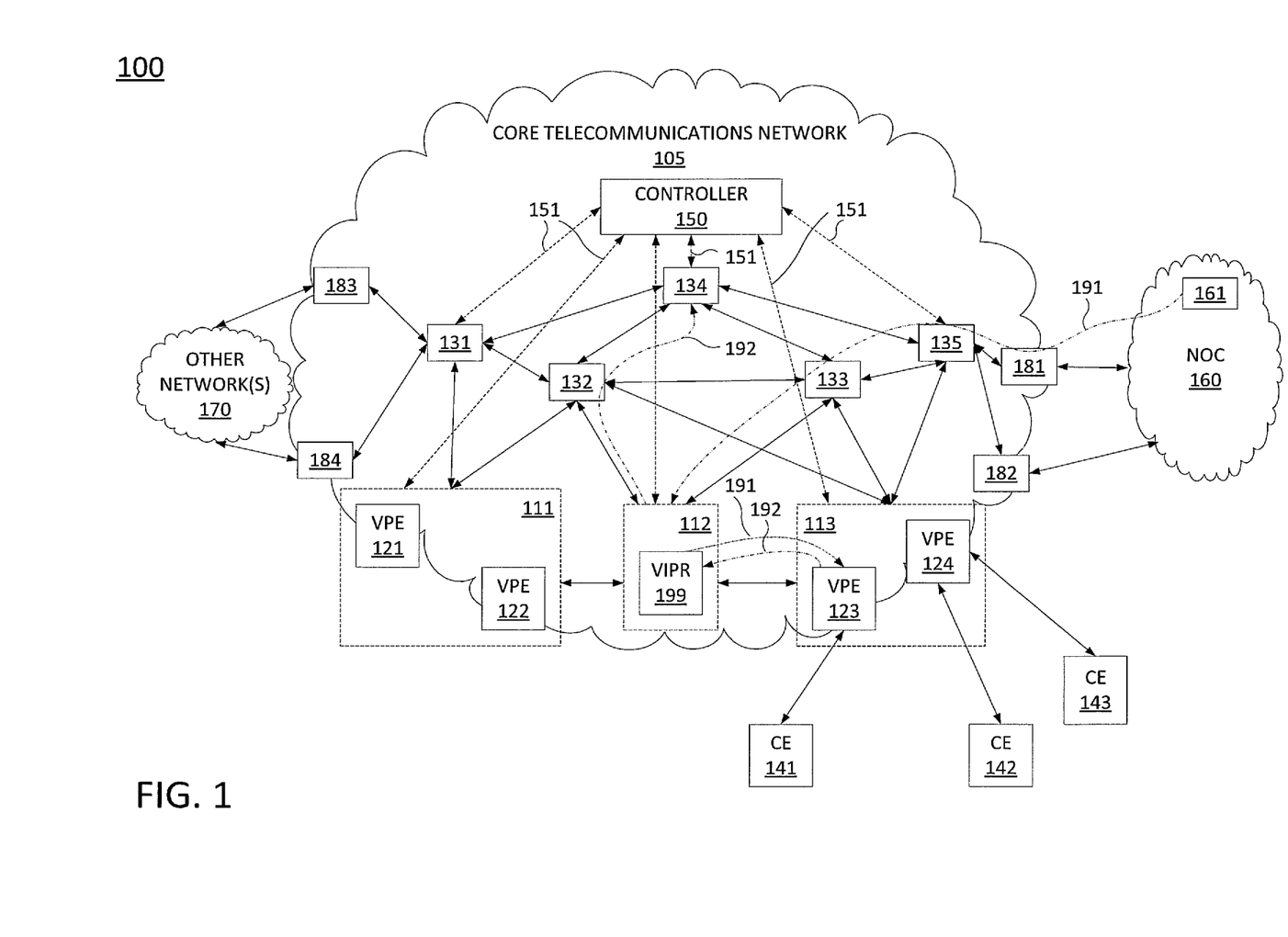
FIG. 1 illustrates an example system related to the present disclosure.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a core network, e.g., a core telecommunications network 105. In one example, the core telecommunications network 105 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs). However, it will be appreciated that the present disclosure is equally applicable to other types of data units and network protocols. In one example, the core telecommunications network 105 uses network function virtualization infrastructure (NFVI), e.g., servers in a data center or data centers that are available as host devices to host virtual machines comprising virtual network functions (VNFs). In other words, at least a portion of the core telecommunications network 105 may incorporate software-defined network (SDN) components.

In one embodiment, the core telecommunications network 105 may be in communication with one or more other networks 170. The other networks 170 may include a wireless network (e.g., an Institute of Electrical and Electronics Engineers (IEEE) 802.11/Wi-Fi network and the like), a cellular network (e.g., 2G, 3G, and 4G networks, a Long Term Evolution (LTE) network, and the like), a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general.

In one example, the core telecommunications network 105 is also in communication with a network operations center (NOC) network 160. For example, the core telecommunications network 105 may be operated by a telecommunications service provider. The NOC network 160 may host various operator devices, monitoring devices, and so on for use by network personnel of the telecommunications service provider in operating the core telecommunications network 105. For instance, device 161 may comprise an operator computing terminal for use by personnel in managing the core telecommunications network 105. Although the NOC network 160 and the core telecommunications network 105 may be operated by the same entity, in one example, the NOC network 160 may comprise a separate domain, e.g., a separate routing domain as compared to the core telecommunications network 105. In one example, core telecommunications network 105 may transport traffic to and from customer and/or subscriber devices, e.g., customer edge (CE) routers 141-143. For instance, the traffic may relate to communications such as voice telephone calls, video and other multimedia, text messaging, email, and so forth among the CE routers 141-143, or between the CE routers 141-143 and other devices that may be accessible via other networks 170.

In accordance with the present disclosure, CE routers 141-143 may access the core telecommunications network 105 via virtual provider edge (VPE) routers, e.g., VPE routers 123 and 124. In one example, VPE routers may comprise virtual network functions (VNFs) which may physically comprise hardware executing computer-readable/ computer-executable instructions, code, and/or programs to perform provider edge (PE) router functions. As illustrated in FIG. 1, VPE routers 123 and 124 may reside on network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. In one example, NFVI 113 may represent a single computing device. Accordingly, VPE routers 123 and 124 may physically reside on the same host device. In another example, NFVI 113 may represent multiple host devices such that VPE routers 123 and 124 may reside on different host devices. In one example, VPE router 123 and/or VPE router 124 may have functions that are distributed over a plurality of host devices. For instance, VPE router 123 may be instantiated and arranged (e.g., configured/programmed via computer-readable/computer-executable instructions, code, and/or programs) to provide for load balancing between two processors and several line cards that may reside on separate host devices.

In one example, the VPE routers 123 and 124 may be managed by a controller 150. In one example, controller 150 may comprise an SDN controller that is responsible for such functions as provisioning and releasing instantiations of VNFs to perform the functions of routers, switches, and other devices, provisioning routing tables and other operating parameters for the VNFs, and so forth. In one example, controller 150 may maintain communications with VNFs and/or host devices/NFVI via a number of control links 151. Control links 151 may comprise secure tunnels for signaling communications over an underling IP infrastructure of core telecommunications network 105. In other words, control links 151 may comprise virtual links multiplexed with transmission traffic and other data traversing core telecommunications network 105 and carried over a shared set of physical links. For ease of illustration, some of the control links 151 may be omitted from FIG. 1. In one example, the controller 150 may also comprise a virtual machine operating on NFVI/host device(s), or may comprise a dedicated device. For instance, controller 150 may be collocated with one or more VNFs, or may be deployed in a different host device or at a different physical location. In one example, the controller 150 may comprise a computing system or server, such as computing system 400 depicted in FIG. 4, and may be configured to provide one or more functions for assigning a virtual provider edge router to a virtual network function implementing a security policy for a core telecommunications network, as described herein.

In accordance with the present disclosure, the management functions of controller 150 may include the selection of NFVI 113 from among various NFVI available in core telecommunications network 105 to host the VPE routers 123 and 124, and the instantiation of the VPE routers 123 and 124, e.g., by downloading computer-executable/computer-readable instructions, code, and/or programs (broadly "configuration code") which, when executed by a processor of the NFVI 113, may cause the NFVI 113 to perform the PE routing functions of VPE routers 123 and 124, respectively. In one example, controller 150 may download the configuration code to the NFVI 113. In another example, controller 150 may instruct the NFVI 113 to load the configuration code previously stored on NFVI 113 and/or to retrieve the configuration code from another device in core telecommunications network 105 that may store the configuration code for VPE router functions as well as configuration code for other VNFs. The management functions of controller 150 may also include the decommissioning of VPE router 123 and/or VPE router 124 when no longer required, the transferring of VPE router 123 and/or VPE router 124 to different NFVI, e.g., when NVFI 113 is taken offline, the assignment of VPE routers 123 and 124 to the respective CE routers 141-143, the assignment of VPE routers 123 and 124 to different CE routers, and so on.

In one example, core telecommunications network 105 may also include additional NFVIs 111 and 112. For instance, VPEs 121 and 122 may be hosted on NFVI 111, while a virtual infrastructure perimeter regulator (VIPR) 199 may be hosted on NFVI 112. NFVIs 111 and 112 may comprise host devices having the same or similar physical components as NFVI 113. In addition, NFVIs 111 and 112 may reside in a same location or in different locations from NFVI 113. In one example, VPE routers 121 and 122, and VIPR 199 may also be controlled and managed by controller 150. For ease of illustration, none of the CE routers assigned to VPE routers 121 and 122 are shown in FIG. 1.

As illustrated in FIG. 1, core telecommunications network 105 may also include internal nodes 131-135, which may comprise various components, such as, non-PE routers, switches, route reflectors, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by controller 150 via additional control links 151. However, at least a portion of the internal nodes 131-135 may comprise dedicated devices or components, e.g., non-SDN reconfigurable devices. Similarly, core telecommunications network 105 may also include PE routers 181 and 182 interfacing with NOC network 160, and PE routers 183 and 184 interfacing with other networks 170. In one example, PE routers 181-184 may also comprise VNFs hosted by and operating on additional NFVI. However, in another example, at least a portion of the PE routers 181-184 may comprise dedicated devices or components.

As mentioned above, core telecommunications network 105 may include a VIPR 199. In one example, the VIPR 199 may be for generating security decisions regarding network management traffic with respect to VPE routers, as described in greater detail below. In one example, VIPR 199 is instantiated and controlled by controller 150. For instance, controller 150 may include at least network security functions of an SDN controller. In one example, controller 150 may be responsible for maintaining and implementing security policy in the core telecommunications network 105. In one example, controller 150 may instantiate one or more VIPRs throughout core telecommunications network 105. The number of VIPRs, the locations and NFVIs on which such VIPRs are instantiated, and so forth, may be selected by the controller 150 based upon various criteria, such as the number of VPE and/or PE routers already deployed and/or operating in a portion of the core telecommunications network 105, a traffic load in a portion of the core telecommunications network 105, and so forth. The controller 150 may also assign VPE routers and/or PE routers to different VIPRs. In the example of FIG. 1, VIPR 199 may be assigned to all of VPE routers 121-124. In one example, controller 150 also provides VIPR 199 with one or more security policies and security policy updates. For instance, a security policy may comprise an access control list (ACL), e.g., a whitelist of domains or devices from which network management traffic for VPEs may originate or to which VPEs may send network management traffic, or a blacklist of domains or devices for which such traffic is not permitted.

In one example, the core telecommunications network 105 may be configured such that all incoming network management traffic for one of VPE routers 121-124 is first routed to VIPR 199. For example, routers within the core telecommunications network (which may be represented by internal nodes 131-135) may be configured to identify network management traffic for VPE routers 121-124 and to forward the network management traffic to VIPR 199, while routing customer data traffic, or other traffic that does not relate to network management functions differently through the core telecommunications network 105. For instance, internal nodes 131-135 may comprise VNFs that are controlled by controller 150 via additional control links to perform such functions. The network management traffic may be identified in various ways, such as by the protocol(s) utilized, the IP address(es) and/or the port number(s) contained within headers of data units in the traffic, and so forth. In one example, all network management traffic outbound from VPE routers 121-124 may also be gated by the VIPR 199 before being sent on to a destination device or other action is taken by VIPR 199

To illustrate, internal node 133, e.g., functioning as a router, may receive network management traffic 191 from device 161 in NOC network 160, such as a request for updating/reconfiguring the VPE router 123, accessing usage logs, retrieving current settings, and so forth. Internal node 133 may forward the network management traffic to the VIPR 199 which may compare the network management traffic, or the request contained therein, to the network security policy (or policies) and make a decision as to whether the request should be allowed, e.g., whether the network management traffic 191 should be forwarded to the VPE router 121 and/or whether the VPE router 123 should be allowed to perform a function in response to the request. In FIG. 1, the VIPR 199 is illustrated as forwarding the network management traffic 191 to the VPE 123. For instance, in this example, the VIPR 199 may permit the VPE router 123 to act upon the request, since the network management traffic 191 originated from NOC network 160, e.g., a trusted domain. For example, the VIPR 199 may allow SSH access from device 161 in NOC network 160 into the VPE router 123, according to the security policy. On the other hand, if NOC 160 and/or the device 161 is not trusted according to the security policy, VIPR 199 may determine that the request should be denied and that the network management traffic 191 should be dropped, blocked, forwarded to another device for quarantine, sandboxing or other security analysis, and so forth.

In another example, VPE router 123 may send network management traffic 192 towards internal node 134. For example, internal node 132 may comprise an SNMP trap for collecting usage reports, statistics, logs, and so forth from VPE routers and other components of the core telecommunications network 105. Thus, in one example, the network management traffic 192 may comprise SNMP traffic that is automatically generated and sent by VPE router 123. In accordance with the present disclosure all outbound network management traffic from VPE routers 121-124 may be gated by the VIPR 199. As such, the network management traffic 192 from VPE router 123 may be first sent to VIPR 199 on NFVI 112. The VIPR 199 may then permit or deny the network management traffic 192 according to the network security policy. In FIG. 1, the VIPR 199 is illustrated as forwarding the network management traffic 192 toward internal node 134 via internal node 132. For instance, internal node 134 may comprise a trusted device according to the security policy. Thus, the security decision may be to permit network management traffic 192.

Notably, as security policies regarding network management traffic for VPE routers in the core telecommunications network 105 change, the controller 150 may receive updates and propagate the updates to VIPRs that are managed by the controller 150, including VIPR 199. By implementing one or more security policies in the VIPRs regarding network management traffic for VPE routers, the security decision making may reside at the network edge, while at the same time management and implementation of the security policy is simplified. For example, as the various VPE routers in core telecommunications network 105 do not each need to maintain separate copies of the security policies, updates do not need to be propagated to all of the VPE routers, there is no need to check a vast number of VPE routers to confirm that each of the VPE routers is implementing the correct and most recent version of the security policies, and so on. In addition, while there is additional routing of network management traffic involved in using a VIPR, such network management traffic does not consume significant resources and bandwidth, e.g., as compared to video, voice, and other customer data traffic. As such, the impact on network performance is minimal when utilizing a VIPR for generating security decisions regarding network management traffic for VPE routers.

It should be noted that the system 100 has been simplified. In other words, the system 100 may be implemented in a different form than that illustrated in FIG. 1. For example, the system 100 may be expanded to include additional networks, such as additional NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, VIPR 199 and VPEs 123 and 124 may be integrated into a single host device/NFVI. In still another example, controller 150, VIPR 199, VPEs 121-124, and/or other network elements may comprise functions that are spread across several devices that operate collectively as a controller, VIPR, or VPE, respectively. Thus, these and other modifications of the system 100 are all contemplated within the scope of the present disclosure.

Figure 2:
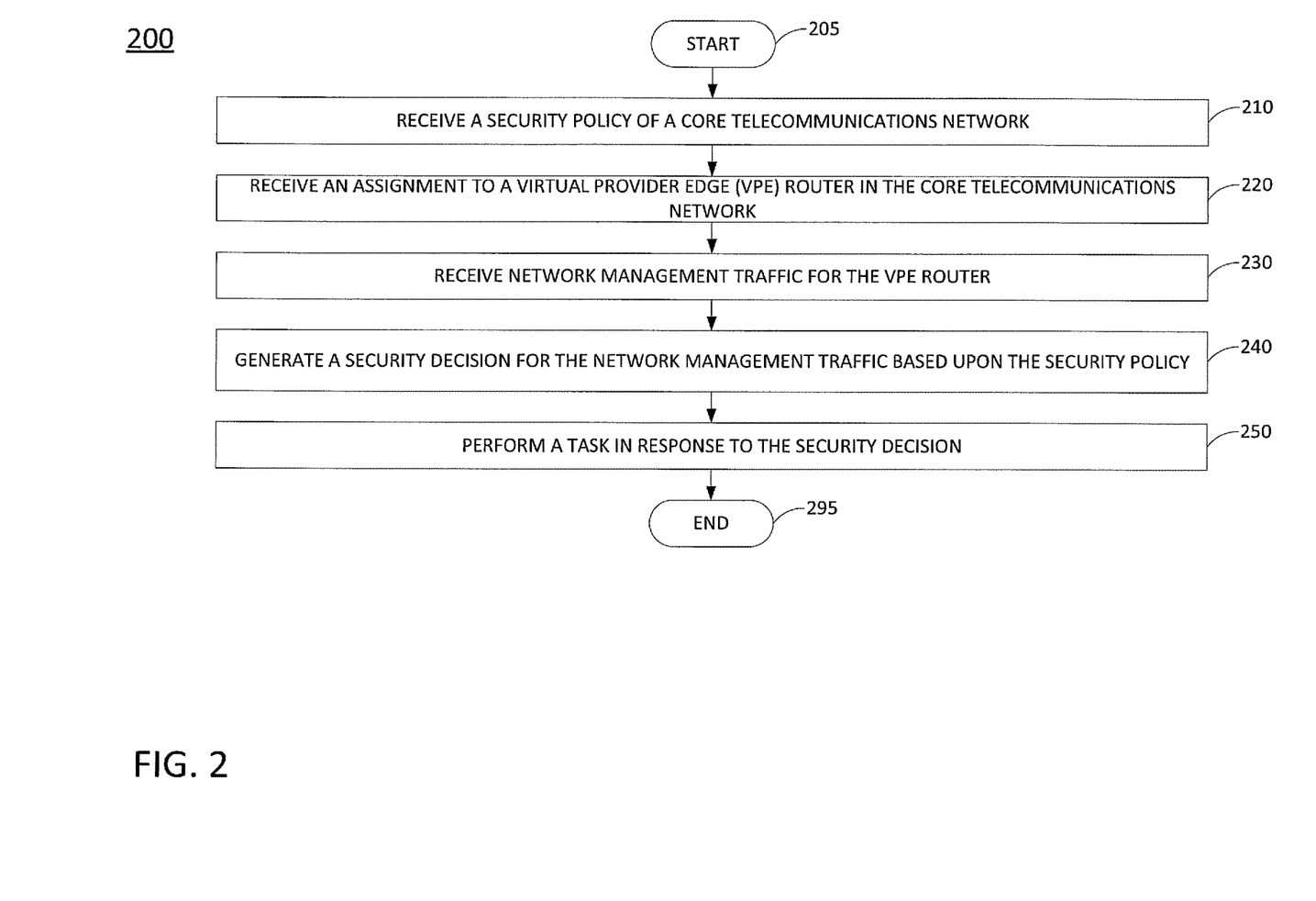
FIG. 2 illustrates a flowchart of an example method for generating a security decision for network management traffic for a virtual provider edge router of a core telecommunications network, in accordance with the present disclosure.

FIG. 2 illustrates a flowchart of an example method 200 for generating a security decision for network management traffic for a virtual provider edge router of a core telecommunications network, in accordance with the present disclosure. In one example, steps, functions and/or operations of the method 200 may be performed by a network-based device, such as NFVI 112 hosting VIPR 199 in FIG. 1, or NFVI 112 hosting VIPR 199 in conjunction with other components of the system 100. In one example, the steps, functions, or operations of method 200 may be performed by a computing device or system 400, and/or processor 402 as described in connection with FIG. 4 below. For instance, computing device or system 400 may represent a NFVI/host device implementing a VNF, e.g., a VIPR. For illustrative purposes, the method 200 is described in greater detail below in connection with an example performed by a processor, such as processor 402. The method begins in step 205 and proceeds to step 210.

At step 210, the processor may receive a security policy of a core network, e.g., a core telecommunications network. In one example, the security policy may be received from a device in the core telecommunications network, e.g., a controller comprising an SDN controller implementing functions relating to network security of the core telecommunications network. In one example, the security policy may comprise an access control list (ACL), e.g., a whitelist of domains and/or devices from which network management traffic may originate or to which network management traffic may be sent and/or a blacklist of prohibited domains and/or devices. In one example, the security policy is applicable to network management traffic intended for virtual network functions (VNFs), e.g., virtual provider edge (VPE) routers of the core telecommunications network, and/or network management traffic outbound from such VNFs. For instance, a device in a NOC, an SDN controller, or other device may attempt to connect to a VPE router to deploy a configuration update, or a VPE router may attempt send SNMP messages to an SNMP trap to report various operating parameters of the VPE router, and so forth. In one example, the network security policy permits network management access to the VPE routers by devices in at least one trusted domain and restricts a network management access to the VPE router by devices that are not in the at least one trusted domain. For instance, the security policy may specify trusted domains, such as NOC networks associated with the core telecommunications network from which network management traffic may originate. For instance, an NOC network specified in the security policy may also be controlled and operated by a network operator of the core telecommunications network. In one example, the at least one trusted domain may comprise a separate routing domain from the core telecommunications network. In another example, the security policy may specify other devices within the core telecommunication network that may be permitted to originate or route network management traffic to the VPE routers or devices to which VPE routers may send network management traffic.

At step 220, the processor may receive an assignment to a VPE router in the core telecommunications network. For example, the controller may send instructions to the processor such that the processor should receive network management traffic for the VPE router and apply the security policy to the network management traffic for the VPE router that is received. In one example, the VPE router may comprise a host device implementing a virtual network function (VNF). In one example, the processor may be assigned to multiple VPE routers. In one example, the processor comprises a processor of a first host device implementing a first VNF, and the VPE router comprises a second host device implementing a second VNF. In one example, the controller is for both instantiating the VNF on the first host device, and instantiating the second VNF (the VPE router) on the second host device. In one example, the VPE router provides access interfaces to the core telecommunications network for a plurality of customer edge (CE) routers.

At step 230, the processor receives network management traffic for the VPE router. In one example, the core telecommunications network may be configured such that all incoming network management traffic for the VPE router is first routed to the processor. The network management traffic may originate from a device in the core telecommunications network, from a device in a network operations center (NOC) network, from the controller, from other networks that are not controlled or operated by a network operator of the core telecommunications network, and so on. In one example, the network management traffic may be received from a SSH or Telnet session to manage the VPE router. The network management traffic may comprise a network management protocol operation, where the network management protocol may comprise SNMP, NETCONF, ConfD, or the like. For instance, the network management traffic may include a request for updating/reconfiguring the VPE router, a request to decommission the VPE router, and/or a request to obtain management information from the VPE router, such as accessing usage logs, retrieving current settings of the VPE router, and so forth. In another example, the network management traffic may be outbound from the VPE router, such as SNMP messages to an SNMP trap, for instance.

At step 240, the processor generates a security decision for the network management traffic based upon the security policy. For example, the security policy may be to permit a request contained in the network management traffic if the network management traffic originates from a trusted device or domain or if the network management traffic is sent by the VPE router to a trusted device or domain. For instance, if the network management traffic originates from the controller in the core telecommunications network or from a NOC network of the operator of the core telecommunications network, the processor may generate a security decision based upon the security policy to forward the network management traffic to the VPE router. On the other hand, if the network management traffic originates in a different domain that is not specified in the security policy, e.g., not in the ACL, the processor may generate a security decision based upon the security policy to deny the request contained in the network management traffic.

At step 250, the processor performs a task in response to the security decision. For instance, the task may comprise forwarding the network management traffic to the VPE router or other device (if the network management traffic is outbound from the VPE router), e.g., if the security decision is to permit the request contained in the network management traffic. In another example, the task may comprise blocking the network management traffic, e.g., if the security decision is to deny the request contained in the network management traffic. In another example, if the security decision is to deny the request contained the network management traffic, the task may comprise sending the network management traffic to another device, e.g., to a quarantine, a sandbox, a honeypot, or other device for security analysis.

Following step 250, the method 200 may proceed to step 295. At step 295, the method 200 ends.

It should be noted that the method 200 may be expanded to include additional steps. For instance, in one example the processor may further receive an updated security policy from the controller and may apply the updated security policy to additional network management traffic for the VPE router. Alternatively, or in addition, the processor may further receive an assignment to an additional VPE router or additional VPE routers, or receive instructions that the processor is no longer assigned to the VPE router, and so on. For example, since VPE routers may comprise VNFs hosted on NFVI/host devices(s), VPE routers may be instantiated and decommissioned at various times. In addition, more or less processors implementing security policy (e.g., VIPRs) may be deployed at various times. For instance, the controller may instantiate and decommission VIPRs for various reasons, such as changing traffic dynamics of the core telecommunications network, new customer edge (CE) routers being deployed, and so forth. Accordingly, the configuration of the processor may also change to accommodate the dynamic nature of the core telecommunications network and its SDN infrastructure. Thus, these and other modifications are all contemplated within the scope of the present disclosure.

Figure 3:
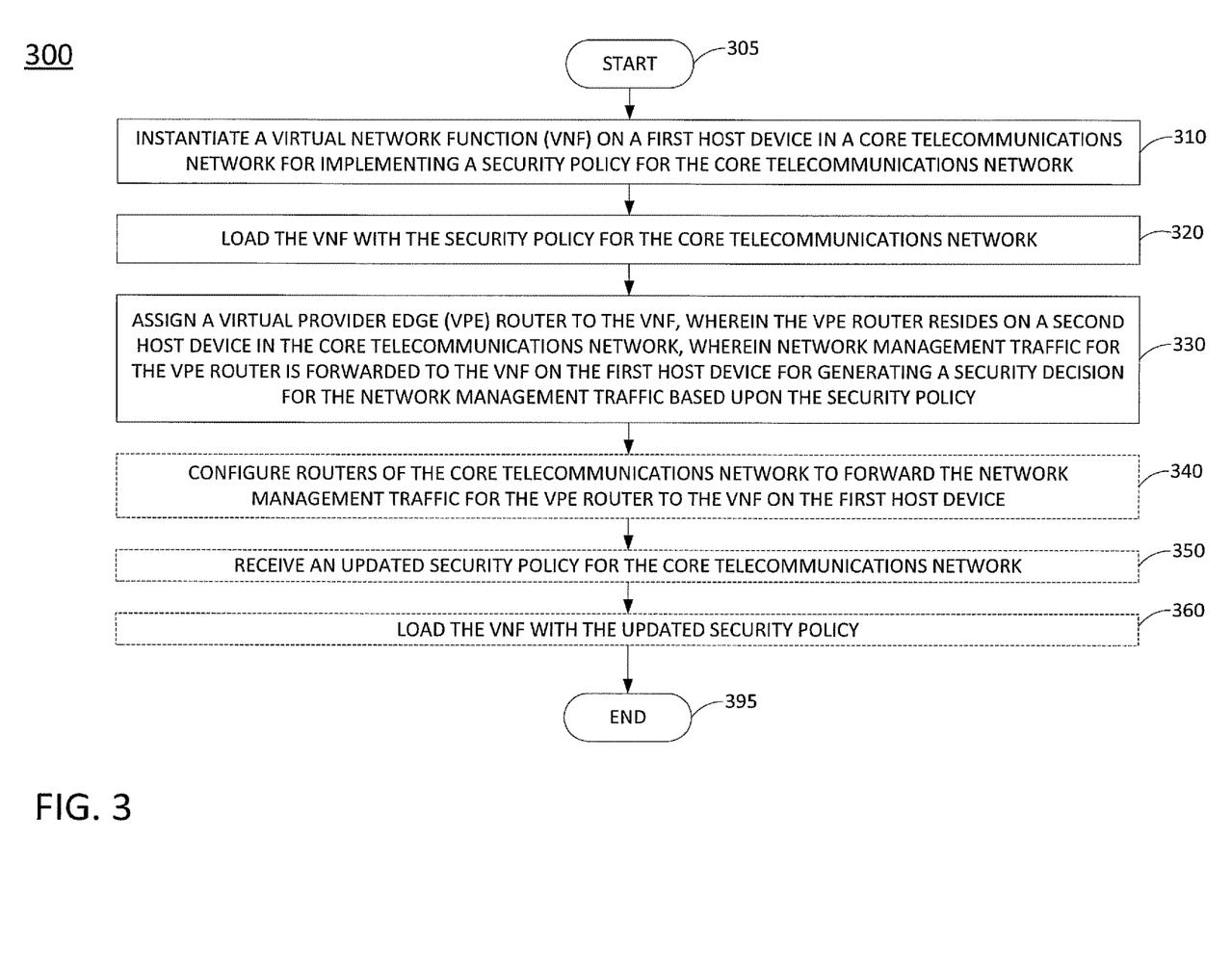
FIG. 3 illustrates a flowchart of an example method for assigning a virtual provider edge router to a virtual network function implementing a security policy for a core telecommunications network, in accordance with the present disclosure.

FIG. 3 illustrates a flowchart of an example method 300 for assigning a virtual provider edge (VPE) router to a virtual network function (VNF) implementing a security policy for a core telecommunications network, in accordance with the present disclosure. In one example, steps, functions and/or operations of the method 300 may be performed by a network-based device, e.g., controller 150 in FIG. 1, or controller 150 in conjunction with other components of the system 100. In one example, the steps, functions, or operations of method 300 may be performed by a computing device or system 400, and/or processor 402 as described in connection with FIG. 4 below. For example, computing device or system 400 may represent a controller, e.g., as a dedicated device, and/or a NFVI hosting a controller as a VNF. For illustrative purposes, the method 300 is described in greater detail below in connection with an example performed by a processor, such as processor 402. The method 300 begins in step 305 and proceeds to step 310.

At step 310, the processor instantiates a virtual network function (VNF) on a first host device in a core telecommunications network. For example, the processor may download configuration code, e.g., for VIPR functions, to the first host device. In another example, the processor may instruct the first host device to load the configuration code previously stored on the host device and/or to retrieve the configuration code from another device in a core telecommunications network At step 320, the processor loads the VNF with a security policy for the core telecommunications network. In one example, the security policy may comprise an access control list (ACL), e.g., a whitelist of domains or devices from which network management traffic may originate or to which network management traffic may be sent, or a blacklist of domains or devices for which network management traffic is prohibited. In one example, the security policy is with regard to network management traffic intended for other VNFs, e.g., VPE routers of the core telecommunications network, and/or network management traffic outbound from such VNFs. For instance, a device in a NOC, an SDN controller, or other device may attempt to connect to a VPE router to deploy a configuration update, or a VPE router may attempt send SNMP messages to an SNMP trap to report various operating parameters of the VPE router, and so forth.

At step 330, the processor assigns a VPE router to the VNF. In one example, the VPE router resides on a second host device in the core telecommunications network. In one example, network management traffic for the VPE router may be forwarded to the VNF on the first host device for generating a security decision for the network management traffic based upon the security policy. In one example, the network management traffic may include a request for updating/reconfiguring the VPE router, accessing usage logs, retrieving current settings of the VPE router, and so forth.

At optional step 340, the processor may configure routers of the core telecommunications network to forward the network management traffic for the VPE router to the VNF on the first host device.

At optional step 350, the processor may receive an updated security policy for the core telecommunications network. In one example, a network operator may transmit the updated security policy to the processor. The updated security policy may add a new trusted domain, e.g., a new NOC network or a NOC network with a new domain identifier, such as a new subnet mask, to a list of permitted sources or destinations of network management traffic for VPE routers, may add a new trusted device, may remove trusted domains or devices from a list of permitted domains or devices, may add devices or domains to a blacklist, and so forth.

At optional step 360, the processor may propagate the updated security policy to the VNF (e.g., a VIPR). The processor may further propagate the updated security policy to additional VNFs (e.g., additional VIPRs) in the core telecommunications network. By implementing security policy regarding network management traffic for VPE routers in VIPRs, the security decision making may reside at the network edge, while at the same time, management and implementation of the security policy is simplified. For example, the various VPE routers in core telecommunications network do not each need to maintain separate copies of the security policy.

Following step 330, optional step 340, optional step 350, or optional step 360, the method 300 may proceed to step 395. At step 395, the method 300 ends.

It should be noted that although not specifically specified, one or more steps, functions or operations of the respective methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure.

As such, the present disclosure provides at least one advancement in the technical field of network management traffic security. For instance, examples of the present disclosure include network-based servers for generating a security decision for network management traffic for a VPE router of a core telecommunications network or for assigning a VPE router to a virtual network function implementing a security policy for a core telecommunications network. For instance, by implementing security policy regarding network management traffic for VPE routers in VIPRs (e.g., in VNFs) under the management of a controller, the security decision making may reside at the network edge, while at the same time, management and implementation of the security policy is simplified. In addition, embodiments of the present disclosure improve the functioning of a computing device, e.g., a server. Namely, servers dedicated to management and implementation of security policy regarding network management traffic for VPE routers are improved in the examples of the present disclosure, such as controller(s) and/or VIPR(s) as described herein.

Figure 4:
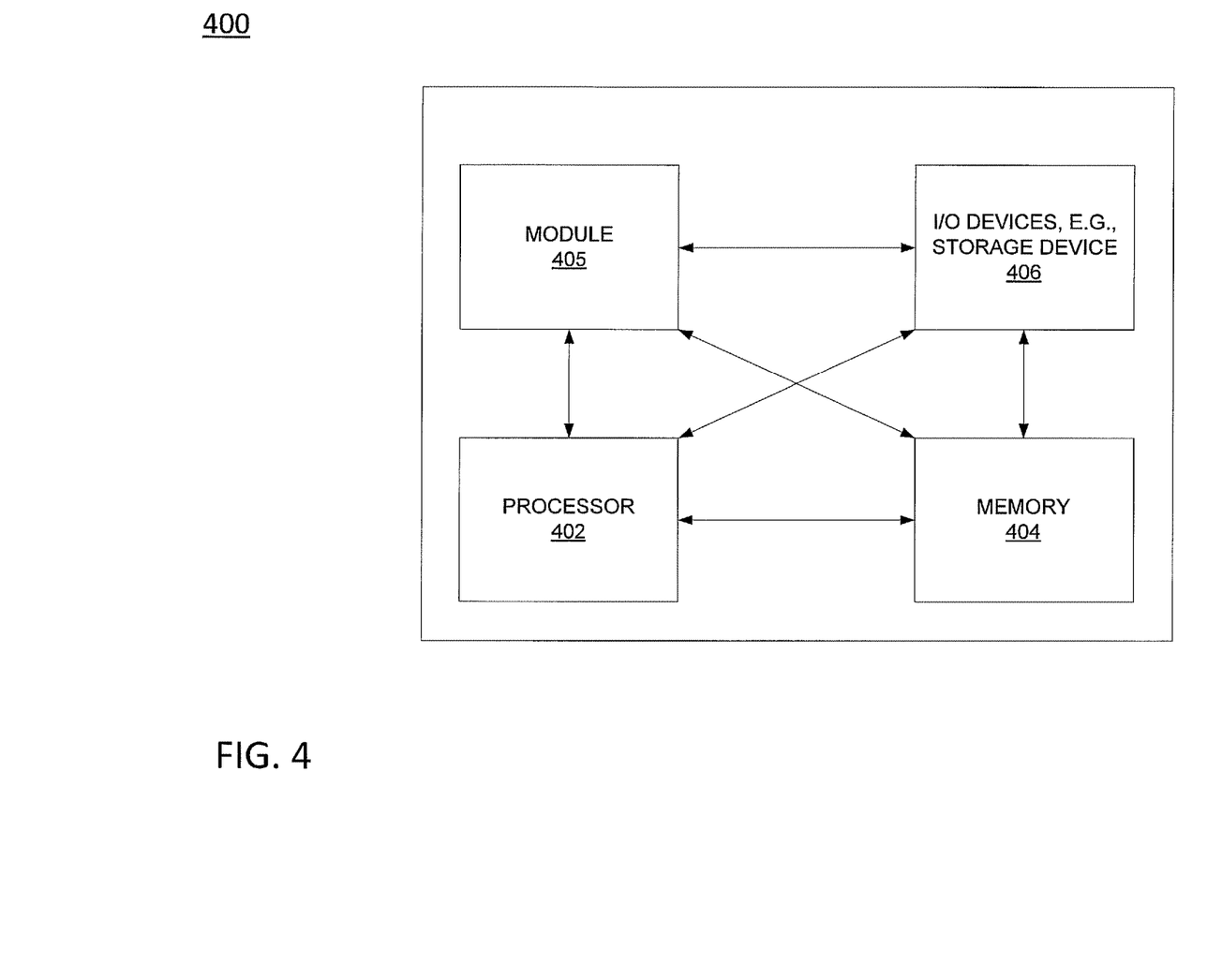
FIG. 4 illustrates an example high-level block diagram of a computer specifically programmed to perform the steps, functions, blocks, and/or operations described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for generating a security decision for network management traffic for a virtual provider edge router of a core telecommunications network or for assigning a virtual provider edge router to a virtual network function implementing a security policy for a core telecommunications network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one embodiment, instructions and data for the present module or process 405 for generating a security decision for network management traffic for a virtual provider edge router of a core telecommunications network or for assigning a virtual provider edge router to a virtual network function implementing a security policy for a core telecommunications network (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for generating a security decision for network management traffic for a virtual provider edge router of a core telecommunications network or for assigning a virtual provider edge router to a virtual network function implementing a security policy for a core telecommunications network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a virtual network function implemented by a processor of a first host device in a network, a security policy of the network;
receiving, by the virtual network function, an assignment for providing a security decision regarding an access by network management traffic to a virtual provider edge router in the network, wherein the assignment is received by the virtual network function from a software defined network controller of the network, wherein the virtual network function is assigned a plurality of virtual provider edge routers, wherein the plurality of virtual provider edge routers comprises the virtual provider edge router, wherein a second host device implements the virtual provider edge router, wherein the first host device is distinct from the second host device;
receiving, by the virtual network function, the network management traffic for managing the virtual provider edge router;
generating, by the virtual network function, the security decision for the network management traffic based upon the security policy; and
performing, by the virtual network function, a task in response to the security decision, wherein the task comprises:
forwarding the network management traffic to the virtual provider edge router on the second host device; or
blocking the network management traffic.

2. The method of claim 1, wherein the network management traffic for the virtual provider edge router is received by the virtual network function from a router of the network.

3. The method of claim 1, wherein the software defined network controller of the network is for:

instantiating the virtual network function on the first host device; and
instantiating the virtual provider edge router on the second host device.

4. The method of claim 1, wherein the network security policy permits a network management access to the virtual provider edge router by devices in at least one trusted domain and restricts a network management access to the virtual provider edge router by devices that are not in the at least one trusted domain.

5. The method of claim 4, wherein, when the network management traffic is received by the virtual provider edge router from a device in the at least one trusted domain, the security decision is to permit a request contained in the network management traffic.

6. The method of claim 4, wherein, when the network management traffic is received by the virtual provider edge router from a device that is not in the at least one trusted domain, the security decision is to deny a request contained in the network management traffic.

7. The method of claim 4, wherein the at least one trusted domain includes a network operations center associated with the network.

8. The method of claim 4, wherein the at least one trusted domain comprises a separate routing domain from the network.

9. The method of claim 1, wherein the network management traffic is received via a secure shell session or a telnet session to manage the virtual provider edge router, wherein the network management traffic comprises a network management protocol operation.

10. The method of claim 1, wherein the network management traffic comprises:
a request to reconfigure the virtual provider edge router;
a request to decommission the virtual provider edge router; or
a request to obtain management information from the virtual provider edge router.

11. The method of claim 1, wherein the virtual provider edge router provides access interfaces to the network for a plurality of customer edge routers.

12. A first host device in a network comprising:
a processor implementing a virtual network function; and
a computer-readable medium storing instructions which, when executed by the processor, cause the processor to perform operations, the operations comprising:
receiving a security policy of the network;
receiving an assignment for providing a security decision regarding an access by network management traffic to a virtual provider edge router, wherein the assignment is received by the virtual network function from a software defined network controller of the network, and wherein the virtual network function is assigned a plurality of virtual provider edge routers, wherein the plurality of virtual provider edge routers comprises the virtual provider edge router, wherein a second host device implements the virtual provider edge router, wherein the first host device is distinct from the second host device;
receiving the network management traffic for managing the virtual provider edge router;
generating the security decision for the network management traffic based upon the security policy; and
performing a task in response to the security decision, wherein the task comprises:

forwarding the network management traffic to the virtual provider edge router on the second host device; or blocking the network management traffic.

13. The first host device of claim 12, wherein the network management traffic for the virtual provider edge router is received by the processor from a router of the network.

14. The first host device of claim 12, wherein the software defined network controller of the network is for:

instantiating the virtual network function on the first host device; and instantiating the virtual provider edge router on the second host device.

15. The first host device of claim 12, wherein the network security policy permits a network management access to the virtual provider edge router by devices in at least one trusted domain and restricts a network management access to the virtual provider edge router by devices that are not in the at least one trusted domain.

16. The first host device of claim 15, wherein, when the network management traffic is received by the virtual provider edge router from a device in the at least one trusted domain, the security decision is to permit a request contained in the network management traffic.

17. The first host device of claim 15, wherein, when the network management traffic is received by the virtual provider edge router from a device that is not in the at least one trusted domain, the security decision is to deny a request contained in the network management traffic.

18. A method comprising:

instantiating, by a software defined network controller implemented by a processor in a network, a virtual network function on a first host device in the network;

loading, by the software defined network controller, the virtual network function with a security policy for the network; and assigning, by the software defined network controller, a virtual provider edge router in the network to the virtual network function for providing a security decision regarding an access by network management traffic to the virtual provider edge router, wherein a plurality of virtual provider edge routers of the network is assigned to the virtual network function, wherein the plurality of virtual provider edge routers comprises the virtual provider edge router, wherein the virtual provider edge router resides on a second host device in the network, wherein the first host device is distinct from the second host device, wherein the network management traffic for managing the virtual provider edge router is forwarded to the virtual network function on the first host device for generating the security decision for the network management traffic based upon the security policy, wherein the security decision indicates at least one of: to forward the network management traffic to the virtual provider edge router of the second host device or to block the network management traffic.

19. The method of claim 18, further comprising:

receiving, by the software defined network controller, an updated security policy for the network; and loading, by the software defined network controller, the virtual network function with the updated security policy.

20. The method of claim 18, further comprising:

configuring, by the software defined network controller, routers of the network to forward the network management traffic for the virtual provider edge router to the virtual network function on the first host device.

* * * * *